Jan. 15, 1963 W. J. DORNHOEFER 3,074,032
TRANSISTOR L-C OSCILLATOR WITH INDUCTIVE FEEDBACK
Original Filed Dec. 2, 1957
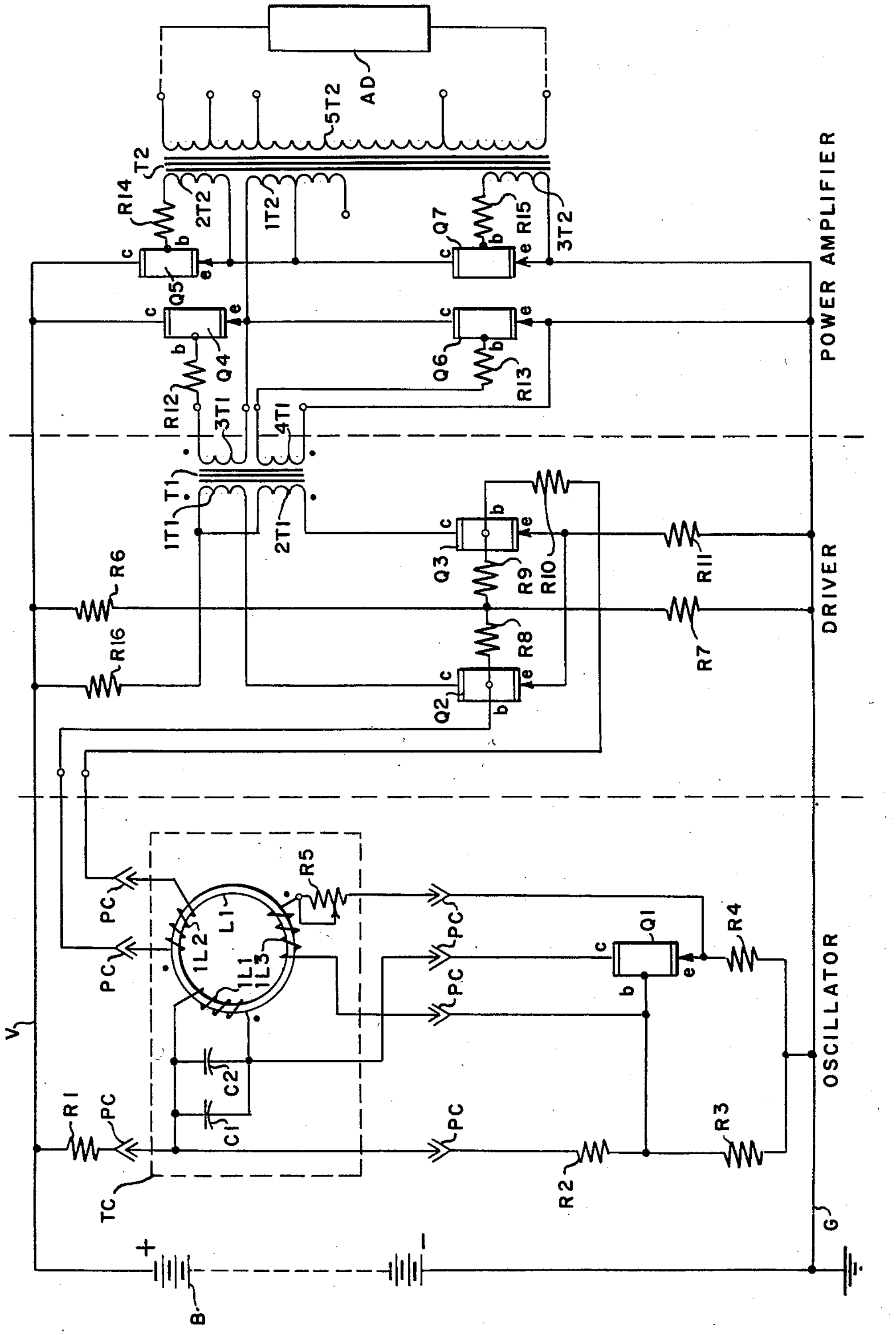

United States Patent Office 3,074,032

Patented Jan. 15, 1963

3,074,032

TRANSISTOR L-C OSCILLATOR WITH INDUCTIVE FEEDBACK

Warren J. Dornhoefer, deceased, late of Littleton, Mass., by Edna M. Dornhoefer, administratrix, Littleton, Mass., assignor to The Warren Manufacutring Company Inc., Littleton, Mass., a corporation of Massachusetts Original application Dec. 2, 1957, Ser. No. 700,147. Divided and this application July 14, 1960, Ser. No. 42,946

5 Claims. (Cl. 331—117)

The invention relates to electric oscillation generators and is herein disclosed as a division from the copending application Serial No. 700,147, filed December 2, 1957, by Warren Dornhoefer, deceased, for Ringing Generator, said application being assigned to the assignee of the present invention.

In a more particular, though not exclusive aspect, the invention relates to an oscillation generator for low operating frequencies, for instance between about 16 and about 66 cycles per second, as desired for the selective operation of electromagnetic bells or the like call devices in telephone and other communication systems.

It is an object of the invention to provide a reliable low-frequency oscillation generator formed exclusively by static and hence mechanically insensitive components that combines an improved frequency stability with a minimum of components while affording a reliable, maintenance-free operation.

This and more specific objects and advantages of the invention as well as the novel features by virtue of which they are achieved, these features being set forth with particularity in the claims annexed hereto, will be apparent from, and will be mentioned in, the following description with reference to the drawing showing, by way of example, a schematic circuit diagram of a ringing generator equipped with an oscillator according to the invention.

In the following description, correlated numerical examples of electric parameter values are given in parentheses; but it should be understood that these values are presented only by way of example and may be modified, in proper correlation to one another, depending upon the requirements or preferences of any particular application. With reference to the parenthetical values, all resistors may be rated for approximately 0.5 watt, with the exception of resistor R9 which may be rated for 1 watt. The transistors Q1 to Q7 of the illustrated generator consist preferably of junction-type transistors, such as p-n-p germanium transistors. The collector electrode of each transistor is denoted by *c*, the emitter electrode by *e* and the base electrode by *b*.

The ringing generator essentially comprises three sequential transistor stages designated on the drawing as Oscillator, Driver and Power Amplifier and hereinafter described in the sequence just given.

The generator system is energized from a source B of constant direct current (48 volts), such as a central-office battery. The positive pole is grounded and is connected to a direct-current bus G. The negative pole is connected to a direct-current bus V.

The oscillator stage of the generator receives voltage from a voltage divider formed by three resistors R1 (3900 ohm), R2 (2700 ohm), and R3 (2700 ohm), connected in series between buses V and G. The base *b* of the oscillator transistor Q1 is connected to a circuit point between resistors R2 and R3. The emitter *e* of the transistor Q1 is grounded through a resistor R4 (4700 ohms) connected to bus G. The collector circuit of transistor Q1, extending from collector *c* to a circuit point between resistors R1 and R2, includes a tank circuit composed of two capacitors C1 (3.3 mfd.), C2 (0.67 mfd.) and an inductance coil 1L1 (25 henrys; the tank circuit parameters are given for 16 c.p.s.). The inductance coil has a toroidal iron core L1 preferably made of powdered permalloy and having a substantially linear characteristic. The core carries two secondary windings 1L2 and 1L3. Winding 1L3 is feedback-connected between the base *b* and the emitter *e* of transistor Q1 through an adjustable resistor R5 (330 ohms, for 16 c.p.s.). The oscillator output is supplied by winding 1L2 to the input terminals of the driver stage.

The tank circuit components C1, C2, L1 and resistor R1 are combined to a unit denoted by TC which is shielded by its own can, and is connected with the other components of the ringing generator by a multiple plug connection whose individual plug-and-socket pairs are denoted by PC. Thus, the generator frequency can be changed simply by exchanging the unit TC for one of different tuning.

The driver stage is essentially a constant sum-current differential amplifier. The input signal from winding 1L2 is supplied to the base *b* of a transistor Q2 and, through a resistor R10 (1500 ohms), also to the base *b* of a transistor Q3. The bases of the two transistors are connected through respective resistors R8 (1200 ohms) and R9 (1200 ohms) to the mid-point of a voltage divider formed by two resistors R6 (10,000 ohms) and R7 (10,000 ohms) extending in series across buses V and G. The emitters of transistor Q2, Q3 each connect through a common resistor R11 to the positive direct-current bus G. The collector circuits of the transistors Q2 and Q3 include respective primary windings 1T1 and 2T1 of a coupling transformer T1 in series with a resistor R16 (680 ohms). The output of the driver amplifier appears at the secondary windings 3T1 and 4T1 of transformer T1. The signal provided by the secondary 1L2 of inductance coil 1L1 is sufficient to cause saturation of the drive amplifier transistors Q2 and Q3. Therefore, the voltage of the secondary windings 3T1 and 4T1 of the driver output transformer T1 is limited and is more square than sinusoidal.

The power amplifier stage of the generator system comprises four power transistors Q4, Q5, Q6, Q7 and a power transformer T2 with a primary winding 1T2, two secondary feedback windings 2T2, 3T2 and a multi-tap output secondary 5T2. The transistors Q4 and Q6 are driven by the driver stage. For this purpose the base *b* of transistor Q4 is connected through a resistor R12 (47 ohms) with the secondary winding 3T1 of the driver output transformer T1; and the base of transistor Q6 is connected through a resistor R13 (47 ohms) to the secondary 4T1 of the same transformer. The two other transistors Q5 and Q7 are driven from the two feedback windings 2T2 and 3T2 of the power output transformer T2 and for this purpose have their respective base-emitter circuits energized from windings 2T2 and 3T2 through respective resistors R14 (47 ohms) and R15 (47 ohms). The output transformer T2 has its secondary winding 5T2 subdivided into a desired number of voltage steps so that, for instance, any desired voltage between 5 and 140 volts may be taken off and applied to the bell or other device AD to be operated. The output transformer is preferably a universal transformer which provides all of the available voltages at all of the frequencies normally used for ringing purposes. Thus, one transformer can be used for 15 different frequencies, depending upon the frequency tuning of the particular oscillator unit being used, thus considerably simplifying the required amount of equipment.

The performance and coaction of the generator components in the above-described system as well as the novel features of the invention will now be described more in detail.

The oscillator in the generator system must hold the desired frequency as accurately as is economically feasible. As described, the oscillator tank circuit C1, C2, 1L1 is connected as a parallel-resonance coil-capacitor combination in the collector circuit of the oscillator transistor Q1; and an additional winding 1L3 on the inductance coil of the tank circuit supplies the emitter-to-base voltage required for sustaining the operation of the oscillator; whereas another isolated winding 1L2 of the same inductance coil furnishes the voltage to drive the next stage of the generator system.

The principal characteristics of this oscillator are its freedom from reactive components other than those that determine the frequency; and its good frequency stability obtained in spite of a very low quality factor (Q) of the toroidal inductor used.

Compared with conventional oscillators, the one according to the invention eliminates several components which would cause frequency changes by themselves, and it also differs from conventional oscillators in obtaining excellent frequency stability with the aid of an inductance coil of very low quality factor (Q), thus achieving a result contrary to that expected from the conventional oscillator theory according to which an oscillator, for frequency stability, is supposed to always require a high Q value, that is, a loaded Q value of the tank circuit above that of a corresponding class C amplifier, and according to which any variation in the reactive component of the coupled impedance is expected to alter the resonant frequency of the tank circuit and hence to produce corresponding changes in the generated frequency. In addition, when accurate frequency is required, the plate supply voltages are usually regulated or stabilized in order to minimize the frequency effect of changes in these parameters. Often too, an effort is made to make the coupling capacitors between the oscillator and the load very large so that their reactance is low and the phase shift to be developed by the resonant circuit is small.

The conventional factors above mentioned are sidestepped by the oscillator of the ringing generator according to the invention. This is done by completely eliminating the coupling capacitors either in the feedback or the load connection. All of the components in the oscillator stage, except the frequency determining components, are either resistors or the transistor elements. Thus, contrary to conventional oscillators, there is nothing in the oscillator stage of this generator to require development of a phase shift or off-resonance operation by the tank circuit. The requisite 360° phase shift is rather provided by the 180° phase shift of the transistor itself, and a 180° phase shift of the feedback winding 1L3 is made simply by means of appropriate connections. The transistor capacitances are the only capacitances which are present in the circuit in addition to those of the frequency determining components. That is, while the capacitance of the frequency determining components C1, C2 may be between 2 and 5 microfarads in all of the oscillators required for all ringing frequencies, the parallel capacitance introduced by the transistor Q1 ($35\cdot10^{-6}$ mfd.) is only in the order of 1/100,000 of the tank circuit capacitance. Hence, the only other capacitance present in the oscillator circuit may be neglected as well as any changes of that capacitance which might otherwise alter the oscillation frequency.

As mentioned, the conventional oscillator theory indicates that, for good frequency stability, the quality factor (Q) of the tank circuit inductance must be high.

At the very low frequencies involved in ringing generators, that is 16 to 66 cycles, this is extremely difficult to obtain. For example, the Q value of the coils actually used in the oscillators of ringing generators vary from 2.5 at 16 cycles to 9.9 at 66⅔ cycles. These Q values would be considered, by conventional theory, as too low and unsuitable for constant frequency performance. However, since the oscillator according to the invention does not have to develop a reactive component of voltage in order to stay in oscillation, an excellent frequency stability is obtained with these low Q coils. Measured results of the coil with the lowest Q value at 16 cycles have shown that the 16 cycle frequency is held constant within .04 cycle for direct-current input voltage variations from 44 to 52 volts and for temperature variations from 79° to 146° F. Actually, since with the kind of oscillator according to the invention, there is no requirement for development of a reactive or phase shift voltage, the important factor for frequency stability is constancy of inductance against changes in temperature, current level and voltage level, rather than a high quality factor.

Conventional oscillators develop frequency changes when the tube or transistor parameters change due to changes of supply voltage, aging, and other factors. Such frequency changes arise from the phase shift which results from the fact that the oscillator circuit comprises additional capacitances of the same order of magnitude as the tank-circuit capacitances. That is, the additional capacitances, such as those of blocking, coupling or bypass capacitors develop reactive voltages and hence cause phase variations.

In contrast, changes in level of oscillation or of supply voltage or collector current will not affect the frequency of an oscillation generator according to the invention, except to the extent as they may cause a change in inductance of the tank-circuit coil 1L1. For this reason, the oscillation generator does not develop an excessive frequency shift when the supply voltage is changed, nor when the temperature is changed, if a suitable powdered-permalloy or other linear-characteristic core material is employed for the core of inductance member 1L.

As mentioned above, the driver stage of the ringing-generator system derives its signal from a resistively coupled voltage supplied by winding 1L2 on the inductance coil L1 of the oscillator tank circuit. This circuit connection does not introduce any phase shift into the oscillator and thus preserves the constancy of the oscillator frequency although it provides adequate voltage to drive the push-pull driver stage. The driver stage as such is essentially conventional except that it is preferable for the purpose of the invention to obtain a somewhat square voltage wave in windings 1T1 and 2T2 of transformer T1 by virtue of the fact that the signal voltage from transformer winding 1L2 is sufficient to cause saturation of the transistors Q2 and Q3 as already described above.

The power amplifier stage of the system is essentially a push-pull amplifier which energizes the primary 1T2 of the power transformer T2 from buses V and G with alternate polarities. The four power transistors Q4 to Q7 operate as switches with the effect that the primary 1T2 of transformer T2 is symmetrically switched at the ringing-frequency rate across the direct current buses V, G and receives a square-wave voltage whose amplitude is substantially the direct-current bus voltage (±48 volts). The circuit connection shown for the power stage comprises four transistors, two being driven by the driver stage and the other two by the feedback windings 2T2 and 3T2 on transformer T2. However, the power-amplifier stage may also be operated by four isolated secondaries on transformer T1.

A further advantage of the ringing generator according to the invention is its versatility relative to its use for different ringing frequencies. In many cases five different ringing frequencies are desired. For such purposes, it is merely necessary to provide several tank-circuit units TC differing from one another only in frequency tuning, while all other components, including the driver and power-amplifier sections, are the same for all frequencies thus made available. The driver and power-amplifier components are preferably combined with the transistor circuit of the oscillator stage so as to form a single main unit which is equipped with a plug-in connector; and the tank circuit, as described, is formed as a separate sub-assembly which can readily be plugged into the main unit. The main unit is provided with fastening means for mounting it on a rack, whereas the tank-circuit assembly is mounted only by plugging it into the main circuit. Hence, in an existing installation a change from one to another ringing frequency can readily be made by exchanging the tank-circuit assembly.

It will be apparent to those skilled in the art upon study of this disclosure that oscillators according to the invention can be modified with respect to individual components and can be used for purposes other than ringing generators without departing from the essential features of the invention and within the scope of the claims annexed hereto.

What is claimed is:

1. An electric oscillation generator, comprising two direct-current supply leads, a voltage divider connected across said leads, a junction transistor having an emitter and having a base connected to said voltage divider at a point of potential intermediate the potentials of said respective leads, said transistor having a collector circuit, a tank circuit tuned to the desired generator frequency and having capacitance means and an inductance member connected parallel to each other in said collector circuit, said inductance member comprising a core of magnetically soft material having negligible hysteresis in its operating range, two secondary windings on said core, one of said windings being feedback-connected between said emitter and said base, and being otherwise bare of reactive elements between said emitter and base and output circuit means connected to said other winding.

2. An electric oscillation generator, comprising two direct-current supply leads, a voltage divider connected across said leads, a junction transistor having an emitter and a collector and a base, an emitter resistor connected between said emitter and one of said leads said collector being connected to the other of said respective leads, said base being connected to an intermediate potential point of said voltage divider, a tank circuit tuned to the desired generator frequency and connected in series with said collector, said tank circuit comprising capacitance means and an inductance member connected in parallel, said inductance member having a toroidal core of substantially linear magnetization characteristic in its operating range, two secondary windings on said core, one of said windings being feedback-connected between said emitter and said base in parallel with said emitter resistor and said voltage divider and being otherwise bare of reactive elements between said emitter and base, and output circuit means connected to said other winding.

3. A ringing-frequency oscillation generator, comprising two direct-current supply buses of which one is grounded, an oscillator stage having a voltage divider connected across said buses, a transistor having an emitter, an emitter resistor, connected to said emitter and connected to said grounded bus said transistor having a base connected to said voltage divider, said transistor having a collector circuit connected to said voltage divider at a point of potential more remote from said grounded bus than said base, a tank circuit tuned to the ringing frequency and having mutually parallel capacitance and inductance members connected in said collector circuit, said inductance member having a magnetizable core of substantially linear magnetic characteristics, two secondary windings on said core, one of said secondary windings being feedback-connected between said emitter and said base in parallel with said emitter resistor and said voltage divider and being otherwise bare of reactive elements between said emitter and base, and transistor amplifier means having an input circuit connected to said other secondary winding to be controlled therefrom and having an output circuit for providing ringing-frequency output voltage.

4. A ringing-frequency oscillation generator, comprising two direct-current supply buses of which one is grounded, an oscillator stage having a voltage divider connected across said buses, a transistor having an emitter, an emitter resistor connected to said emitter and connected to said grounded bus said transistor having a base connected to said voltage divider, said transistor having a collector circuit connected to said voltage divider at a point of potential more remote from said grounded bus than said base, a tank circuit tuned to the ringing frequency and having mutually parallel capacitance and inductance members connected in said collector circuit, said inductance member having a toroidal core of substantially linear magnetic characteristics, two secondary windings on said core, one of said secondary windings being feedback-connected between said emitter and said base in parallel with said emitter resistor and said voltage divider and being otherwise bare of reactive elements between said emitter and base, and amplifying transistor means energized from said buses and connected to said other winding to provide amplifier output voltage.

5. A ringing-frequency oscillation generator, comprising two direct-current supply buses of which one is grounded, an oscillator stage having a voltage divider connected across said buses, a transistor having an emitter, an emitter resistor connected to said emitter and connected to said grounded bus said transistor having a base connected to said voltage divider, said transistor having a collector circuit connected to said voltage divider at a point of potential more remote from said grounded bus than said base, a tank circuit tuned to the ringing frequency and having mutually parallel capacitance and inductance members connected in said collector circuit, said inductance member having a magnetizable core of substantially linear magnetic characteristics, two secondary windings on said core, one of said secondary windings being feedback-connected between said emitter and said base in parallel with said emitter resistor and said voltage divider and being otherwise bare of reactive elements between said emitter and base, amplifying transistor means energized from said buses and connected to said other windings to provide amplified output voltage, said tank circuit inclusive of said core and said secondary windings forming together a unit separable and exchangeable relative to the said other components of the oscillation generator, said unit having plug-in connector means for joining it with said other components, whereby the oscillator frequency can be changed by exchanging the plug-in unit.

References Cited in the file of this patent

UNITED STATES PATENTS

| | | |
|---|---|---|
| 2,092,147 | Barton | Sept. 7, 1937 |
| 2,762,464 | Wilcox | Sept. 11, 1956 |
| 2,855,568 | Lin | Oct. 7, 1958 |

FOREIGN PATENTS

| | | |
|---|---|---|
| 1,185,278 | France | July 31, 1959 |